(12) United States Patent
Poiesz et al.

(10) Patent No.: US 9,400,643 B2
(45) Date of Patent: Jul. 26, 2016

(54) METHODS AND SYSTEMS FOR UPDATING COMPONENTS ON A COMPUTING DEVICE

(71) Applicant: Google Inc., Mountain View, CA (US)

(72) Inventors: Benjamin Poiesz, Mountain View, CA (US); Andrew Abramson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 86 days.

(21) Appl. No.: 14/195,310

(22) Filed: Mar. 3, 2014

(65) Prior Publication Data

US 2015/0248284 A1    Sep. 3, 2015

(51) Int. Cl.
*G06F 9/445* (2006.01)
*G06F 9/44* (2006.01)
*H04W 4/02* (2009.01)

(52) U.S. Cl.
CPC .. *G06F 8/65* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,321,858 B1* | 11/2012 | Marmaros et al. | 717/173 |
| 2004/0010786 A1* | 1/2004 | Cool et al. | 717/170 |
| 2004/0215755 A1* | 10/2004 | O'Neill | 709/223 |
| 2005/0028173 A1* | 2/2005 | Aiba | 719/327 |
| 2007/0055970 A1* | 3/2007 | Sakuda et al. | 717/168 |
| 2007/0192763 A1* | 8/2007 | Helvick | 717/168 |
| 2009/0044182 A1* | 2/2009 | Quin et al. | 717/168 |
| 2009/0070756 A1* | 3/2009 | Wei et al. | 717/172 |
| 2009/0150878 A1* | 6/2009 | Pathak et al. | 717/172 |
| 2009/0260004 A1 | 10/2009 | Datta et al. | |
| 2009/0319848 A1* | 12/2009 | Thaper | G06F 8/64 714/748 |
| 2010/0058310 A1* | 3/2010 | Choi | 717/168 |
| 2010/0162224 A1* | 6/2010 | Bae et al. | 717/170 |
| 2010/0262960 A1* | 10/2010 | Oshiumi et al. | 717/171 |
| 2011/0029359 A1* | 2/2011 | Roeding | G06Q 30/00 705/14.1 |
| 2011/0314440 A1* | 12/2011 | Singhal et al. | 717/101 |
| 2012/0060152 A1* | 3/2012 | Oh et al. | 717/170 |
| 2012/0124570 A1* | 5/2012 | Alberth et al. | 717/173 |
| 2012/0210313 A1* | 8/2012 | Cooley et al. | 717/171 |
| 2012/0272230 A1* | 10/2012 | Lee | 717/173 |
| 2012/0317544 A1* | 12/2012 | Komatsuzaki et al. | 717/106 |
| 2013/0055271 A1* | 2/2013 | Yoo et al. | 718/102 |
| 2013/0091442 A1* | 4/2013 | Diab | G06Q 30/00 715/753 |
| 2013/0111461 A1* | 5/2013 | Zubas et al. | 717/173 |
| 2013/0185563 A1* | 7/2013 | Djabarov et al. | 713/176 |

(Continued)

FOREIGN PATENT DOCUMENTS

WO    WO2014021878 A1    6/2014

*Primary Examiner* — Insun Kang
(74) *Attorney, Agent, or Firm* — McDonnell Boehnen Hulbert & Berghoff LLP

(57) ABSTRACT

Methods and systems for updating components on a computing device are described herein. A computing device may perform an example method, which may include receiving, at the computing device, a notification of an update corresponding to an existing component on the computing device. Responsive to receiving the notification, the computing device may receive inputs from sensors of the computing device, which may provide information indicative of a given state of use, time of day, and location associated with the computing device. Based on a weighted combination of the inputs, the computing device may determine whether to update the existing component on the computing device and update the existing component. In some instances, the computing device may use information provided by another computing device to determine whether or not to initiate an update process.

21 Claims, 6 Drawing Sheets

(56) References Cited

U.S. PATENT DOCUMENTS

| | | |
|---|---|---|
| 2013/0219383 A1 | 8/2013 | Hilerio et al. |
| 2013/0275625 A1* | 10/2013 | Taivalsaari ............ G06Q 10/101 709/248 |
| 2013/0283256 A1* | 10/2013 | Proud ............................ 717/172 |
| 2013/0283257 A1* | 10/2013 | Sen et al. ...................... 717/173 |
| 2013/0326493 A1 | 12/2013 | Poonamalli et al. |
| 2014/0047425 A1* | 2/2014 | Thapar et al. ................. 717/168 |
| 2014/0109047 A1* | 4/2014 | Yu .................................. 717/120 |
| 2014/0109076 A1* | 4/2014 | Boone et al. .................. 717/170 |
| 2014/0201164 A1* | 7/2014 | Skinder ................ G06F 21/6218 707/687 |
| 2014/0304700 A1* | 10/2014 | Kim et al. ...................... 717/173 |
| 2014/0310701 A1* | 10/2014 | Chylinski et al. ............. 717/173 |
| 2014/0344848 A1* | 11/2014 | Busse ................. H04N 21/4122 725/28 |
| 2014/0359596 A1* | 12/2014 | Cohen et al. ................... 717/173 |
| 2015/0020058 A1* | 1/2015 | Cao et al. ...................... 717/170 |
| 2015/0032692 A1* | 1/2015 | Litzenberger ..... G06F 17/30174 707/620 |
| 2015/0154016 A1* | 6/2015 | Liang et al. ................... 717/169 |
| 2015/0169311 A1* | 6/2015 | Dickerson et al. ............ 717/170 |

\* cited by examiner

METHODS AND SYSTEMS FOR UPDATING COMPONENTS ON A COMPUTING DEVICE

BACKGROUND

Unless otherwise indicated herein, the materials described in this section are not prior art to the claims in this application and are not admitted to be prior art by inclusion in this section.

As technology progresses, an increasing amount of devices utilize mobile applications configured to perform a variety of functions. A mobile application may be a software application that is designed to run on and execute programmed tasks for a variety of devices, such as smartphones, tablet computers, and other mobile devices. Mobile applications are typically available through application distribution platforms and may be downloaded by a device wirelessly from a server that holds the applications. In some instances, mobile applications may be downloaded by a device for free or may be downloaded for a purchase price.

SUMMARY

The present application discloses example systems and methods for updating components on a computing device. In one aspect, the present application describes a method. The method may include receiving, at a first computing device, a notification of an update for an existing component on the first computing device and the first computing device is associated with a given account. The method may also include determining by the first computing device from inputs provided by a plurality of sensors, a plurality of parameters of the first computing device and the plurality of parameters comprise a given state of use and a location of the first computing device. The method may further include receiving, at the first computing device, information corresponding to a second computing device associated with the given account, and the information is indicative of a given state of use and a location of the second computing device. The method may also include, based on the plurality of parameters of the first computing device and the information corresponding to the second computing device, the first computing device initiating an update to the existing component based on the notification of the update.

In another aspect, the present application describes another example method. The method may include receiving, at a computing device, a notification of an update corresponding to an existing component on the computing device. Additionally, the method may further include, responsive to receiving the notification, receiving inputs from a plurality of sensors of the computing device, and the inputs provide information indicative of a given state of use, time of day, and location associated with the computing device. The method may also include, based on a weighted combination of the inputs, determining whether to update the existing component on the computing device, and based on the determination, updating the existing component.

In another aspect, the present application describes a non-transitory computer readable medium having stored thereon executable instructions that, upon execution by a computing device, cause the computing device to perform functions. The functions may include receiving, at a computing device, a notification of an update corresponding to an existing component on the computing device. Additionally, the functions may further include, responsive to receiving the notification, receiving inputs from a plurality of sensors of the computing device, and the inputs provide information indicative of a given state of use, time of day, and location associated with the computing device. The functions may also include, based on a weighted combination of the inputs, determining whether to update the existing component on the computing device, and based on the determination, updating the existing component.

In a further aspect, the present application describes a system with a means for updating components on a computing device. The system may include a means for receiving, at a first computing device, a notification of an update for an existing component on the first computing device and the first computing device is associated with a given account. The system may also include a means for determining by the first computing device from inputs provided by a plurality of sensors, a plurality of parameters of the first computing device and the plurality of parameters comprise a given state of use and a location of the first computing device. The system may further include a means for receiving, at the first computing device, information corresponding to a second computing device associated with the given account, and the information is indicative of a given state of use and a location of the second computing device. The system may also include a means for, based on the plurality of parameters of the first computing device and the information corresponding to the second computing device, initiating, at the first computing device, an update to the existing component based on the notification of the update.

In yet another aspect, the present application describes another system with a means for updating components on a computing device. The system may include a means for receiving, at a computing device, a notification of an update corresponding to an existing component on the computing device. Additionally, the system may further include a means for, responsive to receiving the notification, receiving inputs from a plurality of sensors of the computing device, and the inputs provide information indicative of a given state of use, time of day, and location associated with the computing device. The system may also include a means for, based on a weighted combination of the inputs, determining whether to update the existing component on the computing device, and based on the determination, a means for updating the existing component.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
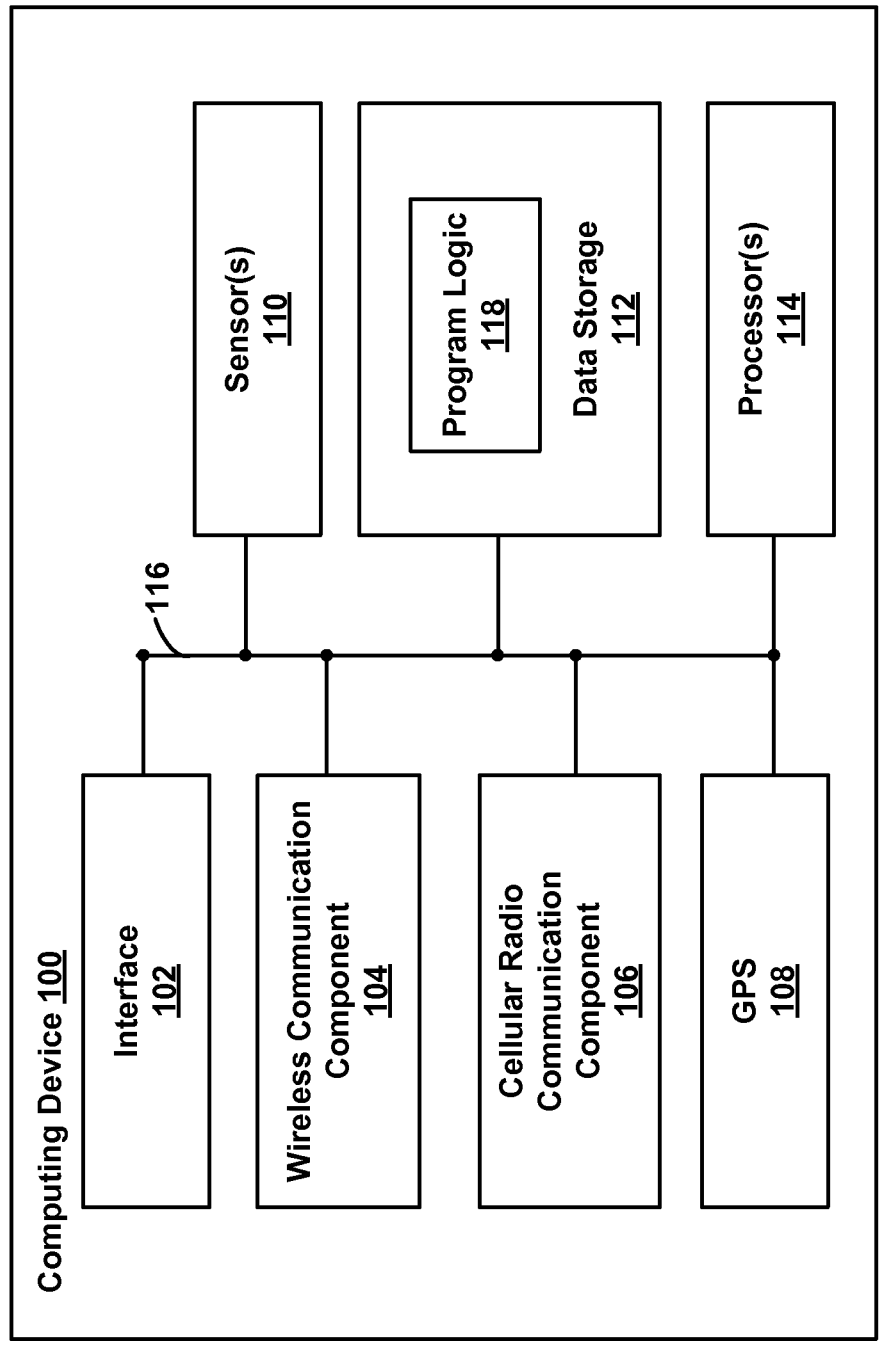
FIG. 1 illustrates a block diagram showing some components of an example device.

In the following detailed description, reference is made to the accompanying Figures. In the Figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The following detailed description generally describes methods and systems for updating components on a computing device. A computing device, such as a mobile phone, tablet computing device, wearable computing device, or other such computing device, may be configured to operate using various components, such as software, applications, device platform(s), etc., to perform functions. A component as discussed herein may include, but is not limited to, various types of computing applications, software, device platforms, configuration components, or other systems of a computing device. For example, a computing device may include gaming applications, work-related applications, photography applications, components software, a device platform, processor(s), or other types of applications configured to perform functions for the computing device. Other examples of components may exist as well.

In some instances, the component(s) on a computing device may require some form of update. The computing device may receive a notification that an update, such as an application or device platform update is available for one or multiple components upon connecting to a server that provides updates or some other indication. For example, the computing device may receive an alert that an "over the air" (OTA) update is available. In response to receiving the notification signaling that an update is available, the computing device may be configured to alert a user of the available update and execute the update process upon receiving approval from the user.

However, in some instances, the computing device may have a particular user available to provide input indicating when the computing device should proceed with updates. For example, example computing devices may be part of an internet kiosk or an interactive display in a retail store, which may limit the computing device from having a primary user that determines when to enable the computing device to perform updates. Similarly, a user may want to automate the component update process (e.g., automatic application updates). In such cases, the computing device may be configured to determine when to perform updates for various components at times that avoid interfering with use and functioning of the computing device. For example, the computing device may perform updates in response to determining that the computing device is not performing any or particular functions for a user. The computing device may factor the type of components being updated when deciding when to initiate an update process. As such, the computing device may have a different determination process for updating applications compared to the determination process for analyzing when to update the device platform of the computing device.

In order to update components of the computing device without impacting its use, the computing device (e.g., a device platform on the computing device) may be configured to determine parameters of the computing device to use to determine appropriate times to execute updates. For example, after receiving an update notification, the computing device may use data provided by sensors to determine when to initiate the update process. In particular, the computing device may determine parameters of the computing device based on the sensor data, which may include determining a state of the computing device and/or location of the computing device. In some instances, the computing device may use sensor data to determine a particular state of an application or system (e.g., device platform) of the computing device as well. The type of component update may cause the computing device to request and/or receive different types of data from sensors.

Computing device sensors may provide information that enables the computing device (e.g., device platform) to determine a variety of parameters associated with the computing device and particular components of the computing device as well. In some example implementations, the computing device may use multiple sensors to acquire the variety of parameters that may assist in determining when to initiate an update process in response to receiving a notification. The different parameters used by the computing device may vary within examples and may depend on the type of component receiving the possible update. For example, in some cases, a computing device may initiate an update process based on a time of day or a motion of the computing device as provided by the sensor(s). The different parameters may be based on the computing device or based on specific components of the computing device.

In an example implementation, the computing device may use a weighted combination of the inputs provided by the sensor(s) to determine when to perform an update process. The weighted combination may be based on a predefined priority of computing device parameters, which may involve giving more weight to certain parameters, such as the computing device's state of motion or interface data. Different components of the computing device may require different weight combination analysis. For example, the computing device may use a particular weight combination of parameters for determining when to update an application and a different weighted combination of parameters for determining when to update applications or other components. Likewise, the weighted combination may involve the computing device applying different multipliers to different parameters as indicated by sensors inputs.

The information provided by sensors to the computing device may indicate a given state of the computing device (e.g., active or inactive state) as well as location, movement, or other information associated with the computing device. The computing device may use all or a portion of the information by sensors to determine when to perform updates. In some instances, the computing device may also enable a user to further define times or situations when to perform updates as well, which may involve using information provided by sensor(s) as well.

Furthermore, in some implementations, a computing device may acquire information from networks (e.g., Wi-Fi networks) and/or other computing devices that may be used to assist the computing device in determining whether or not to perform an update process. Some components, such as an operating system, may require a stronger available network connection. Acquiring information about other computing devices may involve connections provided by a server. For example, the computing device may communicate with other computing devices associated with the same given account, such as a user account, which may involve servers storing and controlling accounts. The computing devices may communicate via a connection established by a server. The server may determine whether or not computing devices may access a particular account based on information provided by the computing devices.

Additionally, the account may link together the multiple computing devices, which may enable the various computing devices to determine information about the other computing devices, such as whether a device is in use or where it is located. A server may connect multiple computing devices associated with a particular account. The computing device may use information acquired from other computing devices to determine whether or not to execute an application or system update process. In some instances, the computing device may also use linked computing devices to determine applications to download, which versions of applications to use, which applications may be approved for updating, or other useful information. For example, an update on one example computing device linked to a given account may indicate to others that updates may be approved for those computing devices. Other examples of linking computing devices using servers and accounts may exist as well.

Systems, methods, and devices in which examples may be implemented will now be described in greater detail. In general, described methods may be implemented by various types of computing devices or components of the devices. In one example, a system may include one or more servers, which may receive information from and provide information to a device, such as a mobile phone or tablet computing device. However, the described methods may also be implemented by other computing devices, such as a personal computer, a wearable computing device, or a mobile device, among others. Examples of wearable computing devices may include example watches or example head mountable displays, etc. Further, an example system may take the form of a computer readable medium, which has program instructions stored thereon that are executable by a processor to provide functionality described herein. Thus, an example system may take the form of a device such as a server, or a subsystem of such a device, which includes such a computer readable medium having such program instructions stored thereon.

Referring to the Figures, FIG. 1 is an example computing device 100. In some examples, components illustrated in FIG. 1 may be distributed across multiple computing devices. However, for the sake of example, the components are shown and described as part of one example computing device 100. The computing device 100 may be or include a mobile device (such as a mobile phone), desktop computer, laptop computer, wearable computing device, email/messaging device, tablet computer, or similar device that may be configured to perform the functions described herein. Generally, the computing device 100 may be any type of computing device or transmitter that is configured to transmit data or receive data in accordance with methods and functions described herein.

In some examples, the computing device 100 may include an interface 102, a wireless communication component 104, a cellular radio communication component 106, a global position system (GPS) receiver 108, sensor(s) 110, data storage 112, and processor(s) 114. Components illustrated in FIG. 1 may be linked together by a communication link 116. The computing device 100 may also include additional hardware or software to enable communication within the computing device 100 and between the computing device 100 and other computing devices (not shown), such as a server entity. The hardware may include transmitters, receivers, and antennas, for example.

The interface 102 may be configured to allow the example computing device 100 to communicate with other computing devices (not shown), such as a server. During operation, the interface 102 may be configured to receive input data from one or more computing devices, and may also be configured to send output data to the one or more computing devices. Additionally, the interface 102 may be configured to function according to a wired or wireless communication protocol. In some examples, the interface 102 may include buttons, a keyboard, a touchscreen, speaker(s), microphone(s), motion sensors, and/or any other elements for receiving inputs, as well as one or more displays, speaker(s), projector(s) and/or any other elements for communicating outputs. Other example computing devices may include more or less components associated with the interface 102 of the computing device 100.

The wireless communication component 104 may exist as a communication interface that is configured to facilitate wireless data communication for the computing device 100 according to one or more wireless communication standards. For example, the wireless communication component 104 may include a Wi-Fi communication component that is configured to facilitate wireless data communication according to one or more IEEE 802.11 standards. As another example, the wireless communication component 104 may include a Bluetooth communication component that is configured to facilitate wireless data communication according to one or more Bluetooth standards. Other examples are also possible.

The cellular radio communication component 106 may function as a communication interface that is configured to facilitate wireless communication (voice and/or data) with a cellular wireless base station to provide mobile connectivity to a network. For example, the cellular radio communication component 106 may be configured to connect to a base station of a cell in which the computing device 100 is located, for example. Other example functions may be executed by the cellular radio communication component 106 as well.

The Global Positioning System (GPS) receiver 108 may be configured to estimate a location of the computing device 100 by precisely timing signals sent by GPS satellites. The computing device 100 may utilize information provided by the GPS receiver 108 to execute functions and determine locations.

The sensor(s) 110 may include one or more sensors, or may represent one or more sensors included within the computing device 100. Example sensors may include an accelerometer, gyroscope, pedometer, biometric sensors, light sensors, microphone, camera(s), infrared flash, barometer, magnetometer, GPS, Wi-Fi, near field communication (NFC), Bluetooth, projector, depth sensor, temperature sensors, or other location and/or context-aware sensors. Other example sensors may be used as well. The different sensor(s) 110 may communicate with each other as well as other components of the example computing device 100. Additionally, the sensor(s) 110 may be configured to capture information for the computing device 100 to use to determine parameters of the computing device 100.

The data storage 112 may store program logic 118 that can be accessed and executed by the processor(s) 114. The data storage 112 may also store data collected by the sensor(s) 110, or data collected by any of the wireless communication component 104, the cellular radio communication component 106, and the GPS receiver 108. For example, the data storage 112 may store applications that perform functions for the computing device 100. The example computing device 100 may include any number of applications configured to execute different functions. For example, some applications may be configured to execute gaming or work-related functions. Other examples of applications may exist as well.

The processor(s) 114 may be configured to receive data collected by any of sensor(s) 110 or received from other computing devices and perform any number of functions based on the data. In some examples, the processor(s) 114 may be configured to determine one or more geographical location estimates of the computing device 100 using one or more location-determination components, such as the wireless communication component 104, the cellular radio communication component 106, or the GPS receiver 108. The processor(s) 114 may use a location-determination algorithm to determine a location of the computing device 100 based on a presence and/or location of one or more known wireless access points within a wireless range of the computing device 100.

In one example, the wireless location component 104 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access points, a location estimate of the computing device 100 may be determined.

In another instance, the processor(s) 114 may use a location-determination algorithm to determine a location of the computing device 100 based on nearby cellular base stations. For example, the cellular radio communication component 106 may be configured to identify a cell from which the computing device 100 is receiving, or last received, signal from a cellular network. The cellular radio communication component 106 may also be configured to measure a round trip time (RTT) to a base station providing the signal, and combine this information with the identified cell to determine a location estimate. In another example, the cellular communication component 106 may be configured to use observed time difference of arrival (OTDOA) from three or more base stations to estimate the location of the computing device 100.

Additionally, the processor(s) 114 of the computing device 100 may determine a given state of the computing device 100 based on data provided by the sensor(s) 110. For example, the processor(s) 114 may use a motion-determination algorithm to determine a state of motion of the computing device 100, which may indicate whether the computing device 100 is stationary or in a state of movement (e.g., being carried by a user). Likewise, the processor(s) 114 of the computing device 100 may detect a presence of light at the computing device 100 using a light-determination algorithm, which may involve receiving data from a camera system or light sensor, for example. The computing device 100 may use the light detection to determine whether the computing device is in an active state or inactive state, for example. Further, the light detection may be used in other ways by the computing device 100.

In some implementations, the computing device 100 may include a device platform (not shown), which may be configured as a multi-layered Linux platform. The device platform may include different applications and an application framework, as well as various kernels, libraries, and runtime entities. In other examples, other formats or operating systems may operate the computing g device 100 as well.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, or communication protocols described in IEEE 802.11 (including any IEEE 802.11 revisions), among other possibilities.

The computing device 100 may include more or fewer components. Further, example methods described herein may be performed individually by components of the computing device 100, or in combination by one or all of the components of the computing device 100.

Figure 2:
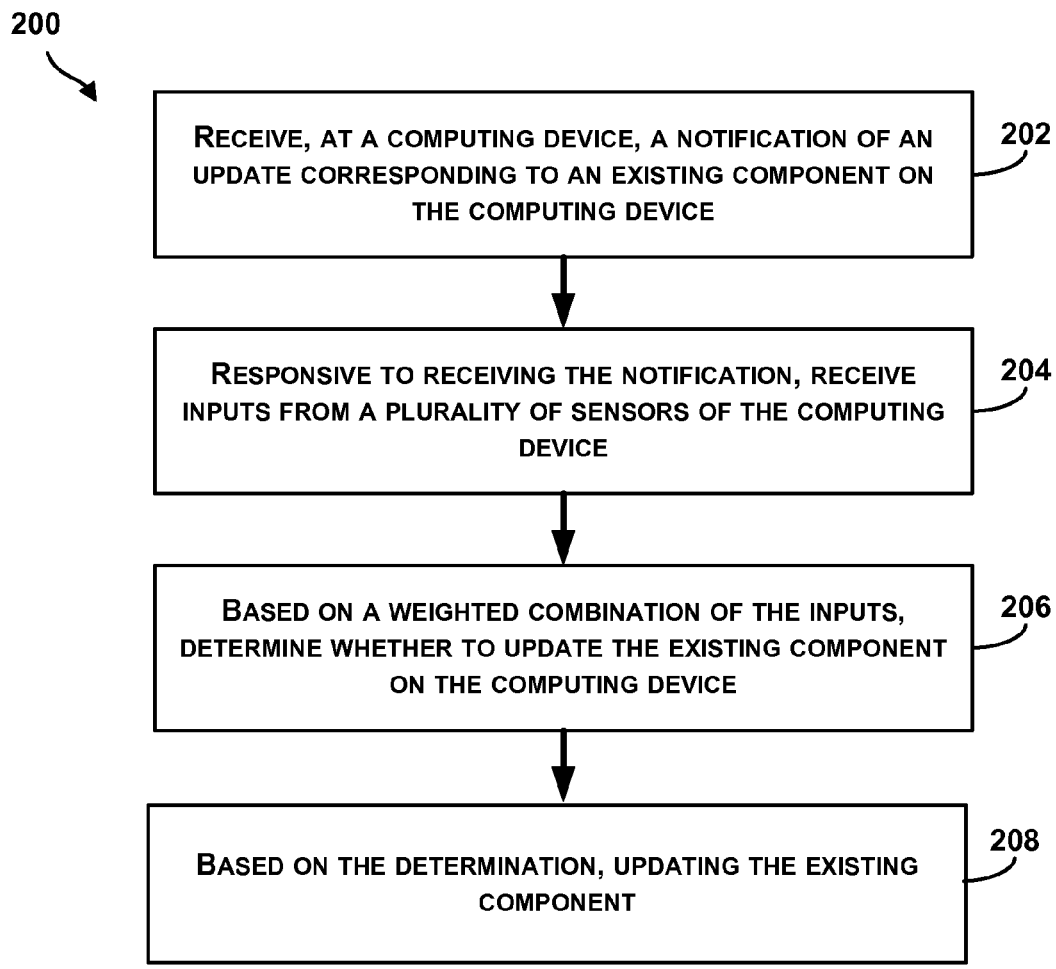
FIG. 2 is a flow chart of an example method for updating components on a computing device.

FIG. 2 is a flow chart of a method 200 for updating components on a computing device. The method 200 may include one or more operations, functions, or actions as illustrated by one or more of blocks 202-208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

Furthermore, for the method 200 and other processes and methods disclosed herein, each block in FIG. 2 may represent circuitry that is wired to perform the specific logical functions in the process. The functions and processes described herein may be executed by an example computing device, which may involve a device platform or other software/hardware components of the computing device executing the functions and processes. A variety of example computing devices may be configured to perform the method 200 or similar methods for updating components. Example computing devices may include mobile phones, personal computers, tablet computing devices, laptop computing devices, wearable computing devices, or other functional devices.

Additionally, example computing devices executing the method 200 may include sensor(s) configured to capture information for the computing device to process. For example, an example computing device, such as the example device 100 shown in FIG. 1, may include various components and sensors to assist in device operations, which may include communication interface components, a camera system, a global positioning system (GPS), a microphone/audio system, a light sensor, gyroscope, accelerometer, biometric sensors, and memory components. In other examples, computing devices executing method 200 or similar methods may include additional or less components within other examples as well. For example, different computing devices may include other types of sensors, such as proximity sensors or other network components.

At block 202, the method 200 includes receiving, at a computing device, a notification of an update corresponding to an existing component on the computing device. An example computing device may be configured to operate using various components, such as applications, software components, device platform(s), etc., to execute functions. Various types of components may exist on a computing device, including, but not limited to, gaming applications, education applications, enterprise applications, work-related applications, device platforms, processors, or other types of applications. The computing device may be configured with components (e.g., applications) during factory manufacturing or may acquire components from a server or another source based on user input. For example, a computing device may download applications wirelessly or through a wired connection from an application store configured on servers. The computing device may utilize the Internet or another electronic medium to receive applications or other types of components as well.

The example computing device may receive notification (e.g., alerts) indicating an update or updates are available for component(s), such as application(s), on the computing device, which may include receiving notification via over the air (OTA) transmissions. For example, a computing device may receive a notification upon a connection to a server (e.g., application store/database). The computing device may be configured to automatically check for application upgrades based on a predefined schedule and/or depending on the computing device's available connectivity to the application store or server holding the available updates. Other examples of receiving notifications corresponding to available updates at a computing device may exist as well.

In an example implementation, an example computing device executing the method 200 may download and store available updates in memory after receiving a notification. The computing device may store the updates until determining the proper time to execute an update process. Storing the download may involve the computing device storing the available update locally on memory of the computing device. In some instances, the computing device may store updates downloaded from a server on another server (e.g., a cloud) available for the computing device to access. In some instances, the computing device may receive notifications of available updates for multiple components of the computing device, which may be different types of components.

At block 204, the method 200 may include, responsive to receiving the notification, receiving inputs from a plurality of sensors of the computing device. After receiving the notification, the example computing device may determine when to perform the update process without interfering with use or functions of the computing device. The computing device may receive and use inputs provided by sensors of the computing device to determine parameters that may assist in determining when to perform an update. The various parameters of the computing device may be indicative of a given state of the computing device, for example. The parameters may also indicate whether or not the computing device may execute updates.

Sensor(s) may provide data indicative of parameters of the computing device, which may correspond to a state of the computing device. For example, the computing device may receive location information from the GPS receiver or from network connections. The computing device may receive data indicative of the location of the device from other sensors as well. Additionally, sensor(s) may provide information indicative of the computing device's state of motion (e.g., whether the computing device is being moved or stationary). For example, the computing device may receive data from an accelerometer and/or gyroscope or other motion-detecting sensors. Other sensors may capture and provide data indicative of the computing device's motion as well. The sensors may capture and provide data specific for particular components or types of components, for example.

In some instances, biometric sensor(s) may provide data to the computing device, which may assist in determining when to initiate an update process. The data provided by biometric sensor(s) may assist the computing device in determining an overall state of the computing device, for example.

Similarly, the computing device may receive data indicative of the local environment of the computing device, such as light data from a light sensor or camera system. A light sensor may detect the presence of light of the local environment of the computing device. This way, the computing device may determine if it is positioned in a dark room, for example. Furthermore, the computing device may receive images and/or data corresponding to detected sound data from sensors, such as a microphone or camera system. Detecting sounds or images of a user may assist the computing device determine when to initiate updates or whether specific components are in use, etc. The computing device may also receive other types of information, such as the time of day or day of the week, from a sensor (e.g., clock) of the computing device. The computing device may receive data corresponding to network availability. Other data may be received at the computing device from sensor(s) as well.

At block 206, the method 200 may include, based on a weighted combination of the inputs, determining whether to update the existing component on the computing device. In particular, the computing device may determine parameter(s) of the computing device based on data provided by computing device sensor(s). The parameters of the computing device may indicate information about the computing device, such as computing device's state of use. The computing device's state of use may indicate whether the computing device is currently an active state (e.g., in use) or inactive (e.g., sleep mode or powered off). The computing device may use its state to determine when to apply updates.

In some implementations, the computing device may determine parameters corresponding to specific functions of the computing device, such as executing an application. Sensor(s) of the computing device may provide data indicating whether a specific component (e.g., application) is executing a function. The computing device may also determine, based on sensor data, whether specific software (e.g., device platform) or applications are executing in the foreground or background. The computing device may determine that an application operating in the background may be able of being updated.

The computing device may factor various parameters to determine when to apply an update, such as the location, motion, and environment of the computing device. Within examples, the computing device may use some of the parameters. For example, the computing device may determine when to update based on a time of day. Similarly, the computing device may determine to initiate updates when the specific component (e.g., application) is inactive or operating in the background. The computing device may also use a combination of the parameters. For example, the computing device may use its state of motion and state of use to determine when to apply an update. Other combinations may exist.

In one example implementation, the computing device may determine a state of vibration of the computing device based on sensor(s) input, which may assist in determining when to apply updates. The computing device may use other factors/parameters corresponding to the computing device for the determination, which may include using sensor data corresponding to the environment, such as light, sounds, or images detected at the computing device.

The computing device may use different processes for particular components or types of components. For example, the computing device may use a weighted combination for determining when to initiate application upgrades and different analysis combinations for determining when to upgrade a different component of the computing device.

The computing device may provide different weights to various parameters received from sensor(s). For example, the computing device may give higher priority to the time of day and motion of the computing device when determining when to initiate updates. In such an example, the computing device may use other parameters, but put more reliance upon the time of day and motion of the computing device when determining when to initiate updates. The computing device may associate weight(s) to the parameters based on a predefined weight given by the user or the computing device. Table 1 below represents an example implementation of a computing device using multiple parameters with assigned priorities to determine when to initiate an update process. The example table 1 shows one possible ordering of parameters associated with the computing device, which may involve the computing device accessing the top priorities (e.g., parameters with priorities 1-3) or accessing more or less priorities to determine when to initiate an update process. Other example tables may include more or less parameters or may assign weight distribution to parameters in other ways, etc.

TABLE 1

| Parameters associated with Device | Priority |
| --- | --- |
| Time associated with the Device (e.g., time of day, week, etc.) | 1 |
| State of Use of the Device | 2 |
| State of Use of Existing Application | 3 |
| State of Motion of the Device | 4 |
| Location of the Device | 5 |
| Sound Detected at the Device | 6 |
| Light Detected at the Device | 7 |
| Images Captured at the Device | 8 |
| Network Connection | 9 |
| CPU Load at the Device | 10 |

In other example implementations, the computing device may access additional parameters associated with the computing device based on data provided by sensors. Likewise, the order of accessing the specific parameters may vary within other examples. For example, the computing device may first determine a state of motion of the computing device prior to determining a state of use of the computing device. The computing device may use the state of motion of the device alone or in addition to other parameters of the computing device for determining when to execute an update. Some components may involve the computing device using a different priority ranking or other weighted combination processes.

Additional parameters may be utilized by a computing device for determining when to initiate an update and/or complete the update process. For example, the computing device may determine based on some parameters that initiating an update process is proper at a given time, but may further determine stopping the update process temporarily based on other parameters (e.g., network connectivity).

In some instances, the computing device may access parameters associated with the computing device at different weight distributions (e.g., giving certain parameters more priority) within examples. For example, a computing device may be configured to use a predetermined or preprogrammed analysis that involves a previous ordering of analysis of parameters by the computing device. The priority may be determined by the computing device based on the reliability of particular sensors or assigned by a user or at factory manufacturing. The state of the computing device may affect the weights applied to the computing device parameters as well.

In one example implementation, the computing device may assign different multipliers to particular parameters received by the computing device. For example, the computing device may assign a higher multiplier to information provided by a sensor or sensors relating to motion of the computing device than light detected at the computing device when accessing when to initiate an update process.

Furthermore, an example computing device may analyze or use different parameters associated with the computing device in different ways to access when to perform an update. For example, the computing device may use a binary determination when analyzing motion data to determine when to apply an update. In such an example, the computing device may be configured to initiate the update process when the computing device determines that the computing device is in a stationary (e.g., resting) position.

Other example parameters may vary in analysis by the computing device. For example, the computing device may be configured to determine light or sound present at the computing device based on a scale. For example, the computing device may determine that a low, medium, or high amount of sound is being received by a microphone at the computing device. In such an example, the computing device may be configured to only initiate an update process when the computing device determines that a low amount of sound is being received and not to initiate the update when a medium or high amount of sound is received at the microphone. The computing device may use threshold determinations to access certain parameters, which may require detecting a certain value of the parameter to determine when to initiate the update. For example, the computing device may be configured to perform an update unless a threshold amount of sound or motion is detected by sensor(s) at the computing device. Other variations involving sensor data, such as sound detected at the microphone or light sensed by a light sensor, may exist within examples as well.

The computing device may be configured to assign certainty associated with particular parameters of the computing device. For example, the computing device may receive clear information indicating that the computing device is in motion. In response, the computing device may assign a high certainty to the motion parameter of the computing device used when determining when to initiate an update. The high certainty to the motion parameter may involve the computing device assigning a high multiplier to the particular parameter in favor of not initiating an update due to the high likeliness that the computing device is in use due to the motion detected.

In another example implementation, the computing device may use information relating to time associated with the computing device as the main parameter for accessing when to initiate an update. For example, the computing device may determine that the time of day is a nighttime hour that the computing device is typically in an inactive state. In response, the computing device may proceed to perform the update process without accessing other parameters provided by sensor information. In such an example, the computing device may update the computing device if the notification is received within a predefined range of time or initiative an update stored in memory during that particular predefined range of time during the day (e.g., 3 A.M.-4 A.M.). The computing device may further perform a similar determination based on other parameters associated with the computing device. For example, the computing device may access if the component (e.g., application) corresponding to the available update is in use. In response to determining that the application is not in use or operating in the background, for example, the computing device may update components (e.g., application) without accessing other parameters. Updating may also involve using cache memory to store an updated version of a component until the computing device may complete the update process without interfering with a user.

At block 208, the method 200 may include, based on the determination, updating the existing component. The computing device may provide instructions to component(s) (e.g., processors) of the computing device to initiate and execute the update process. The update process may update various components, such as applications, device platform(s), components, software, etc. The computing device may execute the update process using the available update, which may be stored in memory or accessed through a wireless or wired connection. The computing device may perform multiple updates simultaneously or may update different components at various times.

Figure 3:
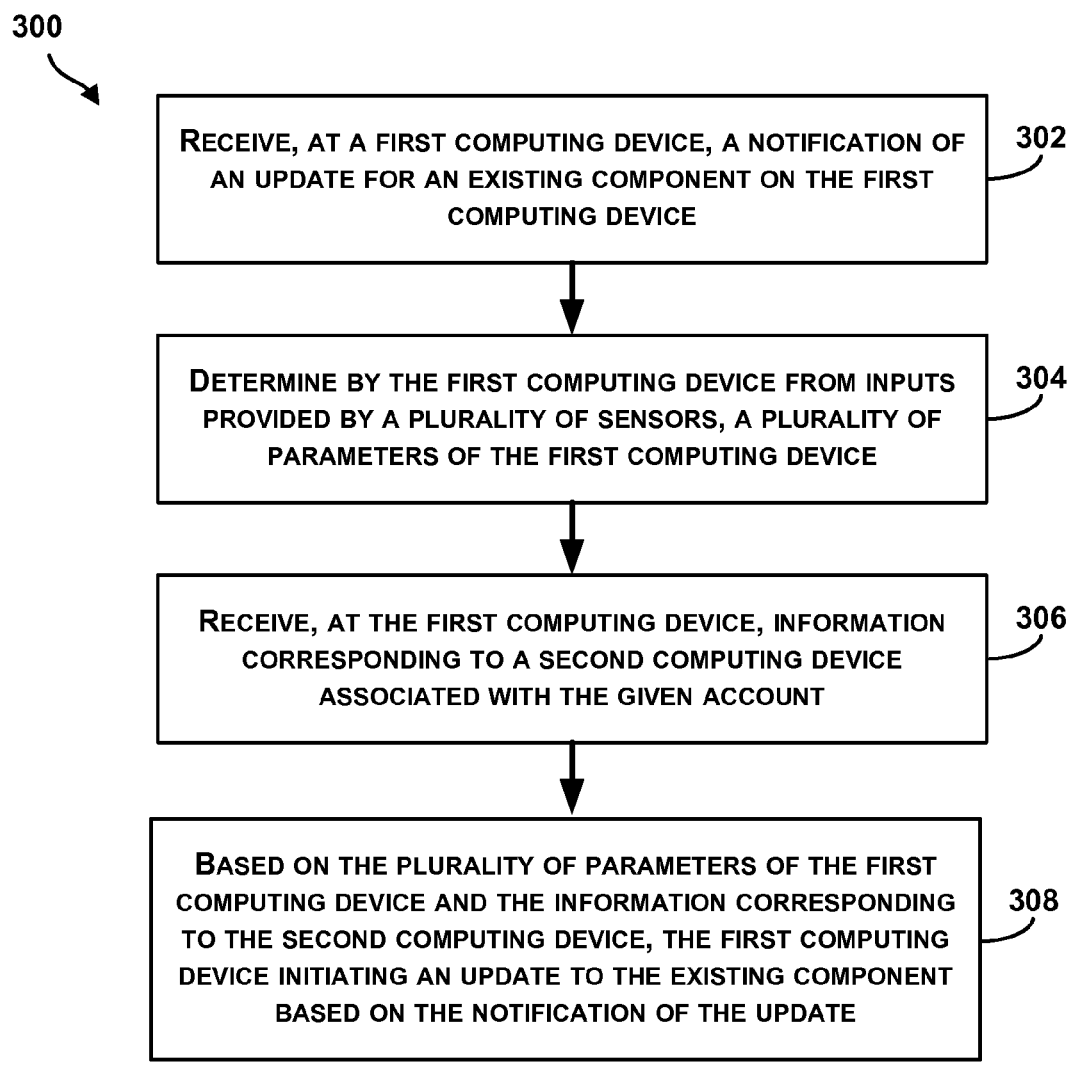
FIG. 3 is a flow chart of another example method for updating components on a computing device.

FIG. 3 is a flow chart of another example method, method 300, for updating components on a computing device. Similar to method 200, an example computing device may execute the method 300 or a similar method to update applications.

At block 302, the method 300 may include receiving, at a first computing device, a notification of an update for an existing component on the first computing device. Similar to the method 200, a computing device may receive a notification that a component update is available. The update may correspond to an existing component on the computing device, which may include updates to applications, systems, software, or device platforms of the computing device. In some implementations, the computing device may receive a notification about an available component (e.g., application) that may not exist on the computing device already, but may be useful for the computing device.

In some implementations, the example computing device executing the example method 300 may be associated with a given account. For example, a computing device may be associated with a user account, which may link computing devices associated with the user account. The user account may enable computing devices associated with the user account to send and receive data with each other. The data transferred between computing devices associated with a user account may vary within examples and may be regulated based on settings determined by the user of the user account. For example, a given computing device may indicate to other computing devices within the user account whether or not the given computing device is in an active state (e.g., powered on or performing functions) or in an inactive (e.g., powered off). The computing devices may provide other information, such as location information, to the other devices associated with the user account.

In an example implementation, an example account, such as a user account, may indicate when updates are available for any applications or other components on one or multiple devices associated with the account. In some instances, an update may apply for components or applications located on multiple computing devices associated with a given account. For example, a first computing device and a second computing device may have the same game application downloaded. The account that links the first computing device and the second computing device may receive a notification of some format indicating that an update is available for that particular game application.

Furthermore, during operation, an example computing device executing the method 300 may receive the notification that a component update is available and download the update in response. For example, the computing device may store the update in some form of memory until the computing device determines At block 304, the method 300 may include determining by the first computing device from inputs provided by a plurality of sensors, a plurality of parameters of the first computing device. Similar to method 200, an example computing device, such as the first computing device, may determine parameters of the computing device based on inputs provided by sensor (s). The different parameters may indicate a state of the first computing device, which may include providing whether the computing device is active or a particular component or application is active, for example. Sensors may provide information to the computing device that assisting the computing device in determining when to perform the update.

The computing device may determine its location and state of use based on sensor data. Likewise, the computing device may determine other parameters, which may include, but not limited to, a time of day, light or sound present at the computing device, motion or vibration of the computing device, etc. The computing device may use other information as well.

At block 306, the method 300 may include receiving, at the first computing device, information corresponding to a second computing device associated with the given account. As previously indicated, multiple computing devices may be linked via an account, such as a general business account or user account. In some instances, a particular user may have a user account, which may link together any computing devices of the users registered to the account. The different computing devices may communicate with each other through a connection established by a server. Likewise, respective computing devices may provide the server with information, which enables other computing devices to access the information on the server. Other examples of communication connections may exist as well.

A particular computing device may receive information from other computing devices, which may or may not be associated with the particular computing device. For example, a first computing device may receive information directly from a second computing device, which may include receive information about location or statuses of the other computing devices.

In another example implementation, a computing device may provide information to a server, which may receive and transmit the data. The computing device may also be configured to access information, like presence and location information, about other computing devices from the server. A computing device may access information about other computing devices through accessing the information stored and/or transmitted by the server.

Any computing device associated with the account, such as a user account, may be able to access information about other devices associated with the account. In some configurations, a computing device may be able to send and receive data with other computing devices associated with the account. In some instances, the computing device may access information about other computing devices, including information relating to the states of use of the other computing devices as well as possible locations of the other computing devices. The information obtained by a computing device about other computing devices may assist the computing device in determining whether or not to update applications or the system, for example. For example, the information provided to the first computing device from another device may be indicative of a given state of use and a location of the other computing device.

At block 308, the method 300 may include, based on the plurality of parameters of the first computing device and the information corresponding to the second computing device, the first computing device initiating an update to the existing component based on the notification of the update. A computing device, such as a first computing device, may receive the information indicating that the second computing device is in use. In the case that the first computing device determines the user is working on another computing device located at a distance away from the first computing device, then the first computing device may proceed to initiate an update process.

As an example, the first computing device may determine when input is received requesting the first computing device to perform one or multiple functions. Likewise, the same first computing device may determine that a second computing device associated with the same user account as the first computing device is located in another room or on another network (e.g., in another building) and is performing functions for the user. The first computing device may determine, based on this information that executing upgrades, such as an application update, at that moment will not interfere with the user, since the user is not utilizing the first computing device and is located at the second distance, which is a distance away from the first device. As a result, the first computing device may update systems or applications without interfering with the user's use of the first computing device.

Different components may require different updates. For example, the device platform of an application update may require the entire computing system to be in an inactive state. A computing device may be configured to update an application that is operating in the background or not in use. Other examples may exist as well.

Figure 4:
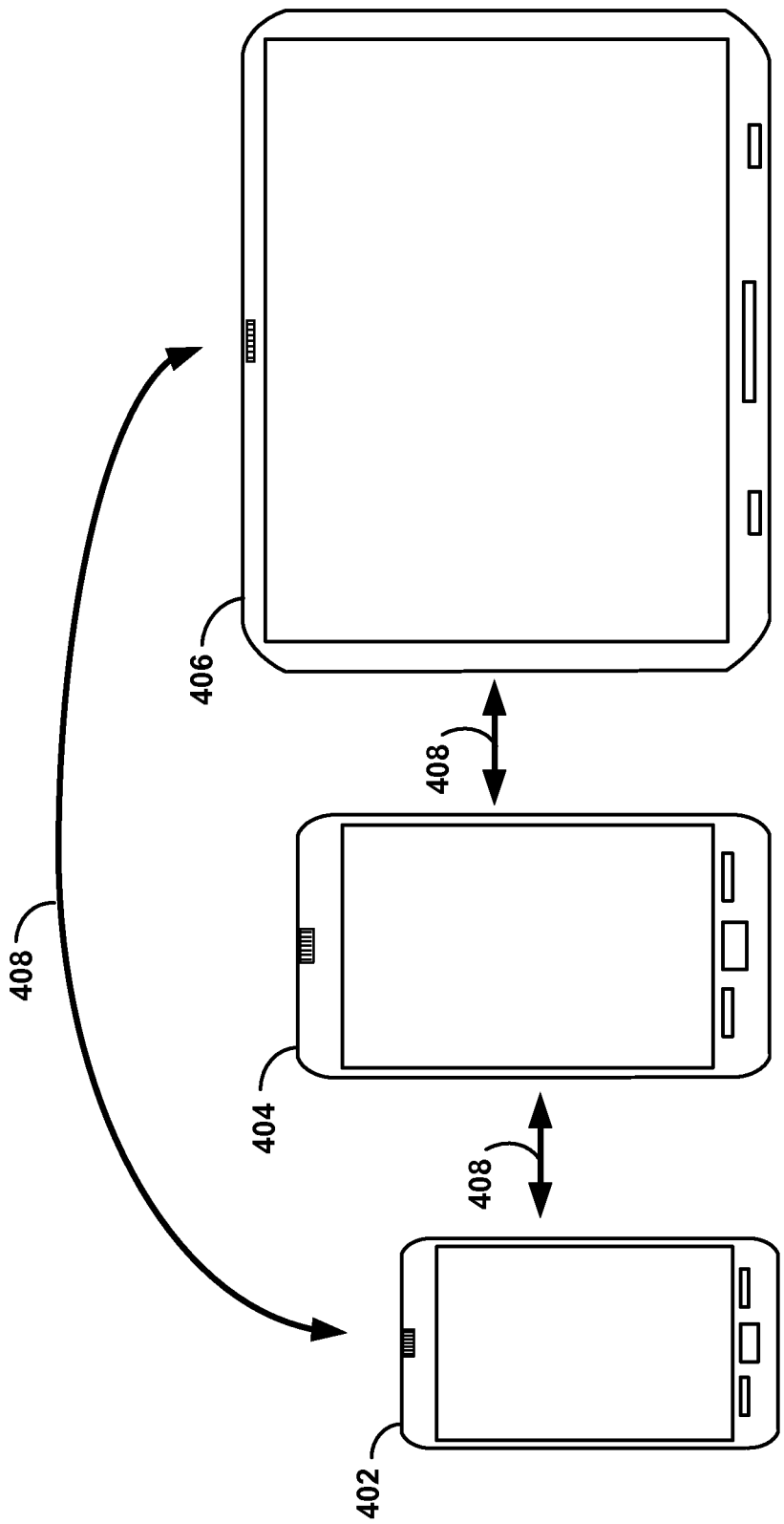
FIG. 4 illustrates an example scenario involving computing devices updating components.

FIG. 4 illustrates an example scenario involving computing devices updating components. In the example scenario, the multiple computing devices 402-406 may each be configured to update components, such as applications, systems, platforms or other data. In order to initiate update processes that may not interfere with a user's use of the computing device, the multiple computing devices 402-406 may communicate with each other, as represented by the communication arrows 408 illustrated in FIG. 4. In the example scenario, computing devices 402-404 represent mobile phones of different sizes and computing device 406 represents a tablet computing device. However, in other examples, other types of computing devices may be used, such as wearable computing devices or laptop computing devices, etc.

Additionally, in some implementations, the multiple computing devices 402-406 or a subset of the devices may be associated with an account or multiple accounts. For example, the different computing devices 402-406 may respectively each be associated with different user accounts, the same user accounts, or may be associated with another type of account, such as a general business account. Other similar formats structures may link devices together to some degree of intercommunication between the computing devices, such as networks, etc. In some situations, the multiple computing devices 402-406 may be part of a display at a retail store or may function as school equipment at a school for students. Similarly, the multiple computing devices 402-406 may function as part of an internet kiosk or another similarly structured environment. In such cases, the multiple computing devices may utilize information provided by or received from other computing devices associated with the same account, which may assist the computing devices in determining when to apply available updates (e.g., application or device platform updates). This way, the computing devices 402-406 may execute component updates, such as application and system updates, without interfering with a user's use of each device. Likewise, the computing devices 402-406 may determine when to apply updates without relying on a primary user to actively select when to apply updates. Within other example implementations, a set of computing devices may include more or less computing devices than shown in FIG. 4.

In some instances, a computing device, such as the computing device 402 shown in FIG. 4, may receive a notification or alert of some type indicating that application update(s) are available for existing applications on the computing device 402. In a similar manner, the computing device 402 may receive a notification indicating that system updates for the device platform or components updates are available in some situations. Different system configurations or connections may enable the computing device to receive notifications indicating available updates. For example, the computing device 402 may receive notifications when connecting to an application providing server or an over the air (OTA) alert.

Upon receiving a notification indicating available updates, the computing device 402 may utilize information acquired by sensors of the computing device 402 to determine whether the computing device 402 is in a proper state for executing the update process. As previously discussed, the computing device 402 may determine a state of the computing device 402, which may involve determining parameters, such as whether the computing device 402 is in use, a location of the computing device 402, a movement of the computing device 402, etc.

In addition, the computing device 402 may receive information from one or multiple of the other computing devices 404-406, which may include receiving indications of the states of the computing devices (e.g., whether each computing device is in use by a user). For example, the computing devices may be configured as an internet kiosk available for use without having primary users. Rather than requiring an owner or primary owner to individually determine when to update the computing devices, the computing devices may utilize sensor information and possibly information acquired from other computing devices or sources (e.g., a server) to determine when to execute application processes.

In an example implementation, computing device 402 may receive a notification indicating that updates for the computing device 402 are available. In some instances, the computing device 402 may download the updates and store the updates in memory prior to executing the update process. After receiving the notification, the computing device 402 may determine a state of the computing device 402 as well as other possible parameters associated with the computing device 402. For example, the computing device 402 may determine whether the computing device 402 is executing functions for a user, whether a particular application is active or inactive, or other information as previously described herein. The computing device 402 may utilize sensors to receive information about possible a possible use of the computing device 4502, such as a microphone, light sensor, camera system, gyroscope, accelerometer, or other sensors. Further, the computing device 402 may also factor in time of day, day of the week, network availability, or other factors in determining whether or not to proceed with an update process.

In some implementations, the computing device 402 may use factors and information provided by sensors on a weighted scale, which may provide more weight or reliance upon certain factors than others. For example, the computing device 402 may factor motion more importantly in determining whether to update the computing device 402 over the amount of light detected by a light sensor. The computing device 402 may also consider parameters of the computing device 402 in a specific order until determining whether or not to initiate an update process. Other examples of utilizing sensor data by a computing device in order to determine when to initiate an update process may exist as well.

In some instances, the computing device 402 may also check whether the other computing devices 404-406 are available for use prior to executing an application process. This way, the computing device 402 may avoid executing an application update process in the case that other computing devices are unavailable for users (e.g., executing an application update process). For example, the computing device 402 may determine both computing device 404 and tablet computing device 406 are currently in use by users or unavailable due to a dead battery or executing an update process, etc. Based on acquiring this information, the computing device 402 may refrain from initiating an update process until receiving an indication that at least one or both computing devices 404-406 are available for use. Having such as structure of checks among computing devices at the same internet kiosk or other similarly structured set up may avoid a situation where all the computing devices are updating at the same time, limiting the availability of the computing devices to the users. At the same time, the communication between the computing devices may also serve as signals for computing devices to update systems or applications as well. For example, the computing device 404 may check computing device 402 and/or computing device 406 to determine that the devices have both updates systems. In response, the computing device 404 may initiate a system update process in order to stay current with the other available computing devices. In some instances, the computing devices may utilize the location of the other devices as well to determine whether or not to execute an application update process.

Figure 5:
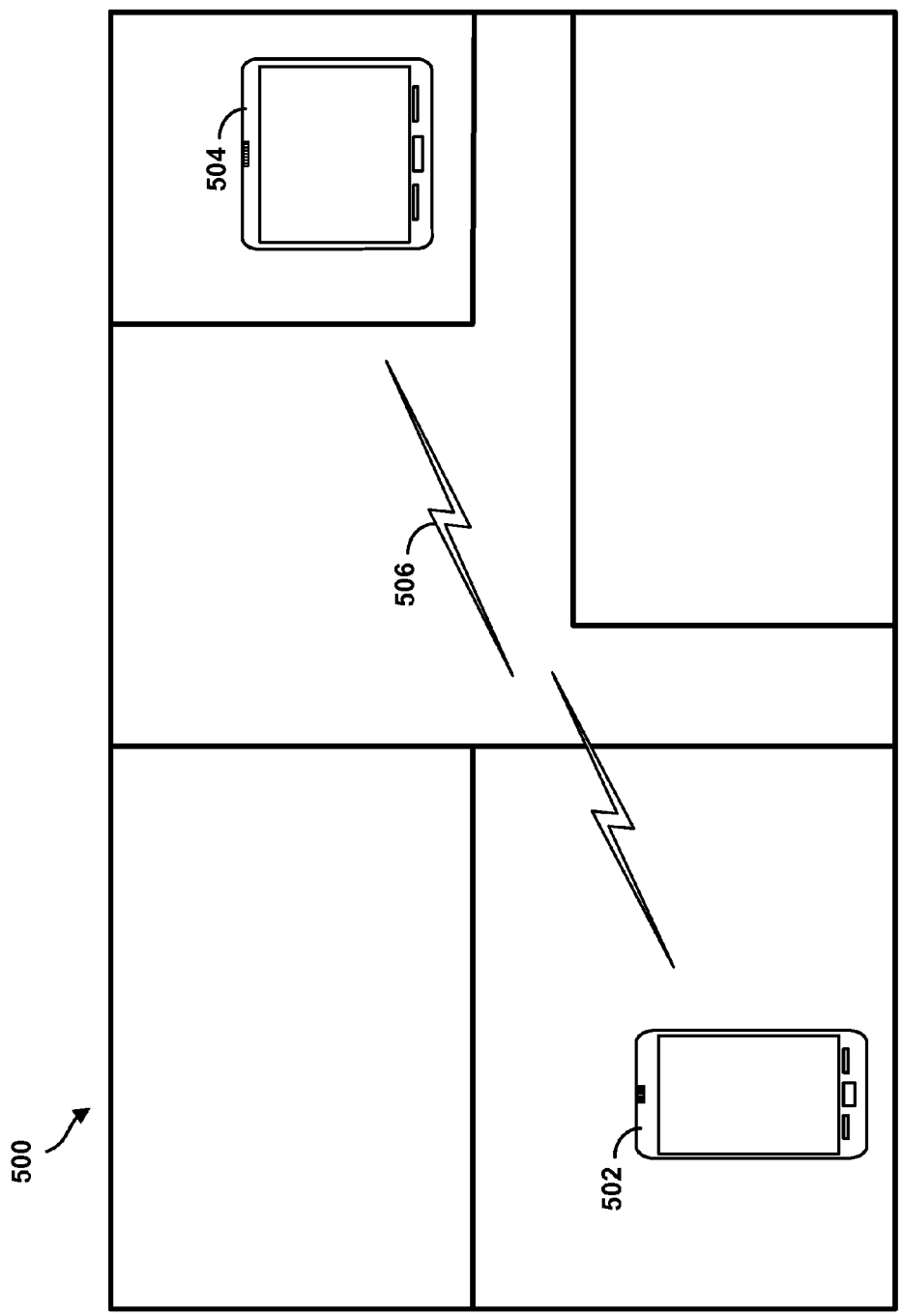
FIG. 5 illustrates another example scenario involving computing devices updating components

FIG. 5 illustrates another example scenario of computing devices updating components. In the example scenario 500 shown in FIG. 5, multiple computing devices 502-504 may communicate via communication link 506 to provide assistance for determining when to initiate update processes. In the example scenario, the computing device 502 is positioned at a distance apart from the computing device 504, which shows the computing devices separated by different rooms in a building. Other distances may be represented as well.

As previously indicated, the computing devices 502-504 may communicate to determine various information, which may include determining a current location of users. For example, the computing device 502 may receive a notification about an available update and determine that it is in an inactive state based on sensor data. The computing device 502 may also acquire information from the computing device 504 through a connection (e.g., a connected user account) that indicates that the computing device 504 is located at a distance away from the computing device 502 and in an active state. The computing device 502 may estimate that the user is likely using the computing device 504 at the remote distance and in response, initiate an application update. This way, the computing device 502 may perform the update without interfering with the availability of the computing device 502.

The computing devices 502-504 may be linked to other devices within other examples. Furthermore, the computing devices 502-504 may communicate via the Internet or other wireless connections, which may be enabled through a server or servers.

As previously indicated, the computing devices 502-504 may also use other parameters to determine whether or not to initiate an update process, which may also be in addition to information provided through the user account by the other computing device. For example, the computing device 502 may use sensor data to determine information about the computing device's possible state, which may include determining the light present, location, motion, detected sound, or other data corresponding to the computing device 502. The computing device may use sensor data as well as information provided by other computing devices to determine when to perform updates. Other examples may exist as well.

Figure 6:
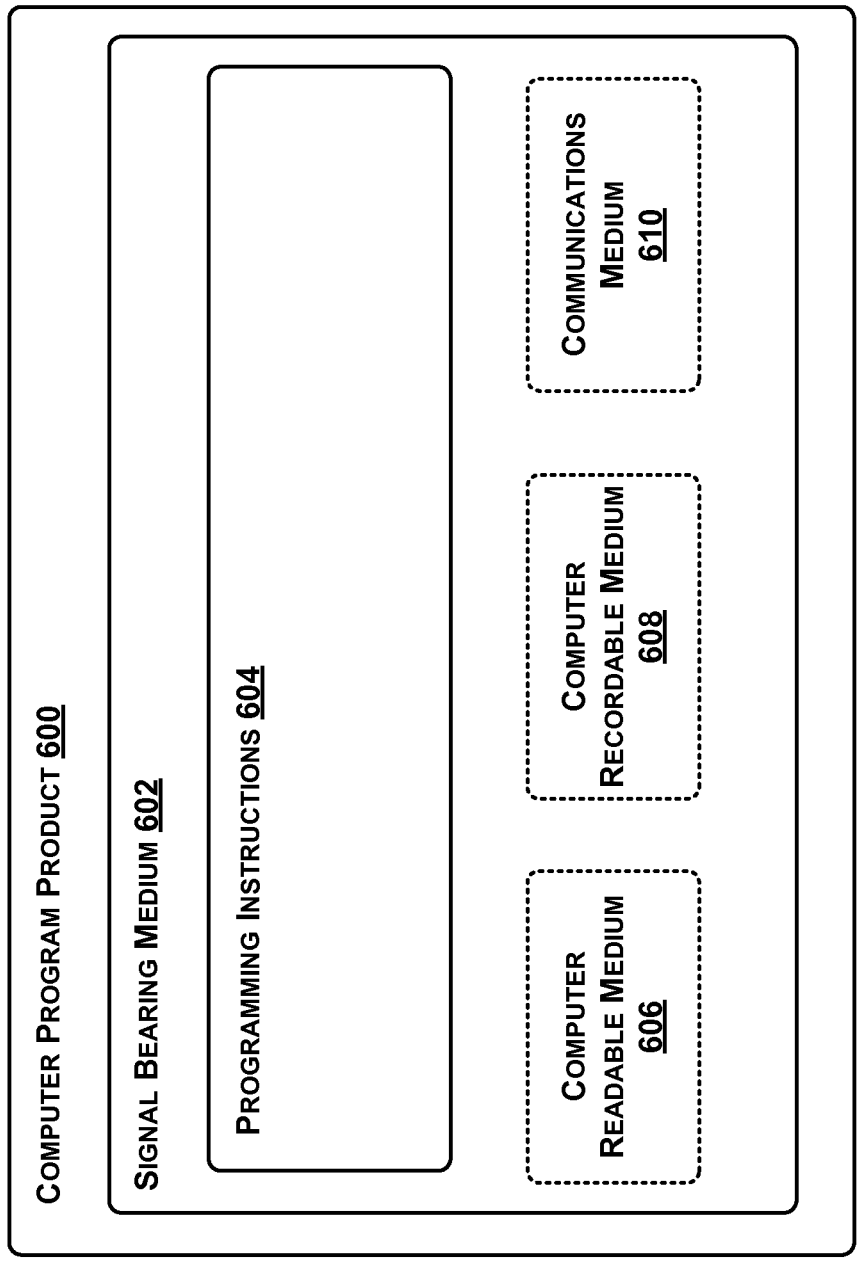
FIG. 6 is a schematic illustrating a conceptual partial view of an example computer program product that includes a computer program for executing a computer process on an example device.

FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-3 and FIGS. 4A-4D. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the processor 112 of FIG. 1 may be configured to provide various operations, functions, or actions in response to the programming instructions 604 conveyed to the processor by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
   receiving, at a first computing device, a notification of an update for an existing component on the first computing device, wherein the first computing device is associated with a user account;
   determining by the first computing device from inputs provided by a plurality of sensors, a plurality of parameters of the first computing device, wherein the plurality of parameters comprise a given state of use and a location of the first computing device;
   receiving, at the first computing device, information corresponding to a second computing device associated with the user account, wherein the information is indicative of a given state of use and a location of the second computing device, and wherein the information is further indicative of whether the update for the existing component on the first computing device was approved on the second computing device to update an existing component on the second computing device;
   based on the plurality of parameters of the first computing device and the information corresponding to the second computing device, determining whether to update the existing component on the first computing device; and
   based on determining to update the existing component on the first computing device, initiating, by the first computing device, the update to the existing component based on the notification of the update.

2. The method of claim 1, wherein the user account has a plurality of computing devices associated with the user account.

3. The method of claim 1, wherein the given state of use indicates whether the computing device is in an active state or inactive active, wherein the computing device executes one or more functions in the active state.

4. The method of claim 1, wherein the first computing device is a mobile phone and the second computing device is a tablet computing device.

5. The method of claim 1, wherein determining by the first computing device from inputs provided by a plurality of sensors, the plurality of parameters of the first computing device further comprises:
   determining a motion state of the computing device based on inputs provided by at least an accelerometer of the first computing device; and
   determining the given state of use based on the motion state of the computing device.

6. The method of claim 1, wherein determining by the first computing device from inputs provided by a plurality of sensors, the plurality of parameters of the first computing device further comprises:
   detecting, via a light sensor, light input captured at the first computing device; and
   determining the given state of use based on the light input.

7. The method of claim 1, wherein based on the plurality of parameters of the first computing device and the information corresponding to the second computing device, the first computing device initiating an update to the existing component based on the notification of the update is further based on one or more of a time of day associated with the first computing device, a central processing unit (CPU) load associated with the first computing device, and a network connection associated with the first computing device.

8. The method of claim 1, wherein determining by the first computing device from inputs provided by a plurality of sensors, the plurality of parameters of the first computing device further comprises:
   detecting, via a microphone, sound input as captured at the first computing device; and
   determining the given state of use based on the sound input.

9. The method of claim 1, wherein based on the plurality of parameters of the first computing device and the information corresponding to the second computing device, the first computing device updating the existing component while the existing component is in an inactive state.

10. The method of claim 1, wherein the first computing device and the second computing device operate within a group of computing devices; and
    wherein based on the plurality of parameters of the first computing device and the information corresponding to the second computing device, the first computing device initiating an update to the existing component based on the notification of the update comprises:
    the first computing device determining the second computing is available for use; and
    responsive to determining the second computing is available for use, the first computing device initiating the update to the existing component based on the notification of the update.

11. A method comprising:
    receiving, at a first computing device, a notification of an update corresponding to an existing component on the first computing device, wherein the first computing device is associated with a user account;
    responsive to receiving the notification, receiving inputs from a plurality of sensors of the first computing device, wherein the inputs provide information indicative of a given state of use, time of day, and a location associated with the first computing device;
    receiving, at the first computing device, information corresponding to a second computing device associated with the user account, wherein the information is indicative of a given state of use and a location of the second computing device, and wherein the information is further indicative of whether the update for the existing component on the first computing device was approved on the second computing device to update an existing component on the second computing device;
    based on a weighted combination of the inputs and the information corresponding to the second computing device, determining whether to update the existing component on the first computing device; and based on determining to update the existing component on the first computing device, updating the existing component.

12. The method of claim 11, further comprising:
storing data indicative of the update in memory on the first computing device.

13. The method of claim 11, wherein the plurality of sensors of the first computing device comprise one or more of a camera, an accelerometer, a gyroscope, a global positioning system (GPS), a biometric sensor, a microphone, a light sensor, and a touch screen.

14. The method of claim 11, wherein the inputs further provide information indicative of a motion state of the first computing device via an accelerometer.

15. The method of claim 11, wherein the inputs further provide information indicative of touch interaction with the first computing device, wherein the touch interaction indicates whether the first computing device is receiving input via touch interface.

16. The method of claim 11, wherein based on the weighted combination of the inputs, determining whether to update the existing component on the first computing device comprises:
determining whether the time of day associated with the first computing device is within a predefined range of time; and
responsive to determining whether the time of day associated with the first computing device is within the predefined range of time, updating the existing component.

17. The method of claim 11, wherein based on the weighted combination of the inputs, determining whether to update the existing component on the first computing device comprises:
determining the first computing device is in an inactive state; and
responsive to determining the first computing device is in an inactive state, updating the existing component.

18. The method of claim 11, wherein the inputs further provide information indicative network connectivity available at the first computing device.

19. A non-transitory computer readable medium having stored thereon instructions that, upon execution by a first computing device, cause the first computing device to perform functions comprising:
receiving, at the first computing device, a notification of an update corresponding to an existing component on the computing device, wherein the first computing device is associated with a user account;
determining by the first computing device from inputs provided by a plurality of sensors of the first computing device, a plurality of parameters of the first computing device, wherein the plurality of parameters comprise a given state of use and a location associated with the first computing device;
receiving, at the first computing device, information corresponding to a second computing device associated with the user account, wherein the information is indicative of a given state of use and a location of the second computing device, and wherein the information is further indicative of whether the update for the existing component on the first computing device was approved on the second computing device to update an existing component on the second computing device;
based on the plurality of parameters of the first computing device and the information corresponding to the second computing device, determining whether to update the existing component on the first computing device; and
based on determining to update the existing component on the first computing device, updating the existing component.

20. The non-transitory medium of claim 19, wherein the existing component is an application on the first computing device;
wherein the inputs further provide information indicating whether the existing application is operating in a foreground of the first computing device, and the functions comprise updating the existing application based on whether the existing application is operating in the foreground of the first computing device.

21. The non-transitory medium of claim 19, wherein determining to update the existing component on the first computing device comprises:
determining a weighted combination of the plurality of parameters, wherein the plurality of parameters further comprise a time of day associated with the first computing device.

* * * * *